US007804546B2

(12) United States Patent
Narita

(10) Patent No.: US 7,804,546 B2
(45) Date of Patent: Sep. 28, 2010

(54) ANTENNA SYSTEM AND TELEVISION RECEIVER

(75) Inventor: Shusuke Narita, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1038 days.

(21) Appl. No.: 11/525,892

(22) Filed: Sep. 25, 2006

(65) Prior Publication Data

US 2007/0069969 A1 Mar. 29, 2007

(30) Foreign Application Priority Data

Sep. 26, 2005 (JP) ............................. 2005-278476

(51) Int. Cl.
*H04N 5/44* (2006.01)

(52) U.S. Cl. ....................................... 348/725; 348/731

(58) Field of Classification Search ......... 348/725–728, 348/731–733; 342/55, 57, 58, 89, 188, 361, 342/362; 343/700 R, 907; 455/19, 25, 63.4, 455/193.1, 269; 725/69, 72; *H04N 5/44, H04N 5/50*

See application file for complete search history.

(56) References Cited

U.S. PATENT DOCUMENTS 5,649,318 A * 7/1997 Lusignan .................... 348/725
7,084,833 B2 8/2006 Pintos et al.

FOREIGN PATENT DOCUMENTS

| | | | |
|---|---|---|---|
| JP | 2002-26601 | A | 1/2002 |
| JP | 2003-179428 | A | 6/2003 |
| JP | 2005-102203 | A | 4/2005 |

* cited by examiner

*Primary Examiner*—Sherrie Hsia
(74) *Attorney, Agent, or Firm*—Crowell & Moring LLP

(57) ABSTRACT

An antenna system including an antenna capable of responding to a horizontally-polarized-wave and a vertically-polarized-wave and receives digital television broadcasting signals. The system further includes: a memory section to store an outdoor reception program and an indoor reception program; an acquisition section to configure in the antenna a horizontally-polarized-wave reception mode or a vertically-polarized-wave reception mode, and to acquire reception information of the television broadcasting signals; a determination section to determine whether the antenna is installed outdoors or indoors; a configuration section to control the outdoor reception program stored in the memory section when the determination section determines that the antenna is installed outdoors, and the indoor reception program stored in the memory section when the determination section determines that the antenna is installed indoors; and a control section to control the reception of the television broadcasting signals by the antenna system through the program configured.

4 Claims, 4 Drawing Sheets

ANTENNA SYSTEM AND TELEVISION RECEIVER

BACKGROUND OF THE INVENTION

1. Field of the Invention

The present invention relates to an antenna system and a television receiver.

2. Description of Related Art

A television broadcasting signal received by an antenna of an antenna system is transmitted in the form of horizontally-polarized-wave. As there are little objects to reflect the television broadcasting wave outdoors, the antenna when installed outdoors will receive the horizontally-polarized-wave. On the other hand, as there are many objects indoors, it may be preferable, when the antenna is installed indoors, to receive the vertically-polarized-wave.

For that purpose, an antenna which can receive both a horizontally-polarized-wave signal and a vertically-polarized-wave signal has been proposed (e.g. JP-2005-102203A: Document 1 and JP-2002-26601A: Document 2). An antenna which can transmit a horizontally-polarized-wave signal and a vertically-polarized-wave signal has also been proposed (JP-2003-179428A: Document 3).

As mentioned above, the optimum polarization of a television broadcasting signal to be received by an antenna is varied depending on the installation location of the antenna. Accordingly, as a reception algorithm to be used for acquiring the optimum signal and restoring the signal needs to be varied depending on the cases when the antenna is installed indoors and outdoors, it is necessary to preset the installation location information of the antenna in, for instance, a television receiver to which the antenna is connected. This will raise an issue that such presetting is troublesome. Moreover, this not only will impose a burden upon a user of the television receiver, but also may make retailers or a manufacturer thereof take additional measurements to respond to complaints from the users claiming that the television receiver could not get good reception even if such ill-reception of the television signal was caused by users' incorrect presetting or configuration.

SUMMARY OF THE INVENTION

An object of the present invention is to provide an antenna system and a television receiver, in which whether the installation location of an antenna is indoors or outdoors is automatically configured so that the burden that will be imposed upon a user and others can be lightened.

In order to achieve the above object, according to a first aspect of the invention, the television receiver comprises antenna system which includes an antenna capable of responding to a horizontally-polarized-wave and a vertically-polarized-wave and receives digital television broadcasting signals, the antenna system further comprising:

a memory section to store an outdoor reception program for receiving television broadcasting signals when the antenna is installed outdoors, and an indoor reception program for receiving the television broadcasting signals when the antenna is installed indoors;

an acquisition section to configure in the antenna a horizontally-polarized-wave reception mode or a vertically-polarized-wave reception mode, and to acquire reception information of the television broadcasting signals by means of the antenna system in the respective reception modes;

a determination section to determine whether the antenna is installed outdoors or indoors, based on the reception information acquired by the acquisition section when the antenna is in the horizontally-polarized-wave reception mode or in a vertically-polarized-wave reception mode;

a configuration section to control the outdoor reception program stored in the memory section when the determination section determines that the antenna is installed outdoors, and the indoor reception program stored in the memory section when the determination section determines that the antenna is installed indoors; and a control section to control the reception of the television broadcasting signals by the antenna system through the outdoor reception program or the indoor reception program, both configured by the determination section, wherein the reception information acquired by the acquisition section includes:

a receivable information obtained when the television broadcasting signal is received in the horizontally-polarized-wave reception mode or in the vertically-polarized-wave reception mode, which are respectively configured in the antenna;

a first error rate acquired from the television broadcasting signal received by the antenna system when the antenna is configured in the horizontally-polarized-wave reception mode and the receivable information is acquired; and a second error rate acquired from the television broadcasting signal received by the antenna system when the antenna is configured in the vertically-polarized-wave reception mode and the receivable information is acquired, and the determination section determines:

that the antenna is installed in the out-of-doors, in a case that the receivable information is acquired only when the horizontally-polarized-wave reception mode is configured in the antenna by the acquisition section;

that the antenna is installed indoors, in a case that the receivable information is acquired only when the vertically-polarized-wave reception mode is configured in the antenna by the acquisition section;

that the antenna is installed outdoors by calculating a difference by subtracting the second error rate from the first error rate, which error rates are acquired by the acquisition section, in a case that the receivable information is acquired both in the horizontally-polarized-wave reception mode and in the vertically-polarized-wave reception mode when they are configured in the antenna by the acquisition section and when the calculated difference is larger than a predetermined threshold value; and that the antenna is installed indoors when the calculated difference is not larger than the predetermined threshold value.

According to the first aspect of the invention, it will be possible to configure, by the acquisition section, a horizontally-polarized-wave reception mode or a vertically-polarized-wave reception mode in the antenna for each of the television broadcasting signals which correspond to a predetermined number of channels receivable by the antenna system, and to acquire the reception information of the television broadcasting signals by means of the antenna system in the respective reception modes. It will also be possible to determine, by the determination section, whether the antenna is installed outdoors or indoors based on the reception information acquired by the acquisition section in the horizontally-polarized-wave reception mode or in the vertically-polarized-wave reception mode. It will further be possible to configure, by the configuration section, (1) the outdoor reception program, stored in the memory section, if the number of the determination results, among the determination results which are acquired by the determination section based on the reception information of the television broadcasting signals corresponding to the predetermined number of the channels, that indicate that the antenna is installed in the-outdoor is larger than the number of the determination results that indicate that the antenna is installed indoors, and (2) the indoor reception program, stored in the memory section, if the number of the determination results indicating that the antenna is installed indoors is larger than the number of the determination result indicating that the antenna is installed in the outdoor. Furthermore, it will be possible to control, by the control section, the reception of the television broadcasting signals through the outdoor reception program or the indoor reception program configured by the configuration section.

Accordingly, whether the installation location of the antenna is outdoors or indoors is automatically configured, and the burden that may be imposed upon a user or the others can be lightened. Furthermore, as the installation location is identified based on a number of the determination results, the installation location of the antenna is accurately identified. Moreover, as the antenna can be used with the optimum reception program depending on the installation location thereof, the reception performance of the antenna can be increased.

In addition to the above, it will be possible, by the determination section, to determine (1) that the antenna is installed outdoors, if the receivable information is acquired only when the horizontally-polarized-wave reception mode is configured in the antenna by the acquisition section, (2) that the antenna is installed indoors, if the receivable information is acquired only when the vertically-polarized-wave reception mode is configured in the antenna by the acquisition section, (3) that the antenna is installed outdoors by calculating a difference by subtracting the second error rate from the first error rate, which error rates are acquired by the acquisition section, if the receivable information is acquired both in the-horizontally-polarized-wave reception mode and in the vertically-polarized-wave reception mode when they are configured in the antenna by the acquisition section and when the calculated difference is larger than a predetermined threshold value, and (4) that the antenna is installed indoors when the calculated difference is smaller than the predetermined threshold value. That is, as the installation location of the antenna can be identified based on the on-site verification and on the error rates related to whether or not digital television broadcasting can be received in a good condition, the installation location of the antenna is more accurately identified.

In accordance with a second aspect of the invention, the antenna system includes an antenna capable of responding to a horizontally-polarized-wave and a vertically-polarized-wave and receives digital television broadcasting signals, the antenna system further comprising:

a memory section to store an outdoor reception program for receiving television broadcasting signals when the antenna is installed outdoors, and an indoor reception program for receiving the television broadcasting signals when the antenna is installed indoors;

an acquisition section to configure in the antenna a horizontally-polarized-wave reception mode or a vertically-polarized-wave reception mode, and to acquire reception information of the television broadcasting signals by means of the antenna system in the respective reception modes;

a determination section to determine whether the antenna is installed outdoors or indoors, based on the reception information acquired by the acquisition section when the antenna is in the horizontally-polarized-wave reception mode or in a vertically-polarized-wave reception mode;

a configuration section to control the outdoor reception program stored in the memory section when the determination section determines that the antenna is installed outdoors, and the indoor reception program stored in the memory section when the determination section determines that the antenna is installed indoors; and a control section to control the reception of the television broadcasting signals by the antenna system through the outdoor reception program or the indoor reception program, both configured by the determination section.

According to the second aspect of the invention, it will be possible, by an acquisition section, (1) to configure a horizontally-polarized-wave reception mode or a vertically-polarized-wave reception mode in the antenna and to acquire reception information of the television broadcasting signals by means of the antenna system in the respective reception modes, (2) to determine, by a determination section, whether the antenna is installed outdoors or indoors, based on the reception information acquired by the acquisition section when the antenna is in the horizontally-polarized-wave reception mode or in a vertically-polarized-wave reception mode, (3) to configure, by a configuration section, the outdoor reception program stored in the memory section when the determination section determines that the antenna is installed outdoors, and the indoor reception program stored in the memory section when the determination section determines that the antenna is installed indoors, and (4) to control, by a control section, the reception of the television broadcasting signals by the antenna system through the outdoor reception program or the indoor reception program, both configured by the determination section.

Accordingly, whether the installation of the antenna is outdoors or indoors can be automatically determined and, hence, the burden that may be imposed on a user and the others can be lightened. Moreover, as the antenna can be used with the optimum reception program depending on the installation location thereof, the reception performance of the antenna can be increased.

In the antenna system, the reception information acquired by the acquisition section may include:

a receivable information obtained when the television broadcasting signal is received in the horizontally-polarized-wave reception mode or in the vertically-polarized-wave reception mode, which are respectively configured in the antenna;

a first error rate acquired from the television broadcasting signal received by the antenna system when the antenna is configured in the horizontally-polarized-wave reception mode and the receivable information is acquired; and a second error rate acquired from the television broadcasting signal received by the antenna system when the antenna is configured in the vertically-polarized-wave reception mode and the receivable information is acquired, and the determination section may determine:

that the antenna is installed outdoors, in a case that the receivable information is acquired only when the horizontally-polarized-wave reception mode is configured in the antenna by the acquisition section;

that the antenna is installed indoors, in a case that the receivable information is acquired only when the vertically-polarized-wave reception mode is configured in the antenna by the acquisition section;

that the antenna is installed outdoors by calculating a difference by subtracting the second error rate from the first error rate, which error rates are acquired by the acquisition section, in a case that the receivable information is acquired both in the horizontally-polarized-wave reception mode and in the vertically-polarized-wave reception mode when they are configured in the antenna by the acquisition section and when the calculated difference is larger than a predetermined threshold value; and that the antenna is installed indoors when the calculated difference is not larger than the predetermined threshold value.

According to the antenna system having such a structure, in addition to those advantages, it will be possible to determine, by the determination section, (1) that the antenna is installed outdoors, in such a case that the receivable information is acquired only when the horizontally-polarized-wave reception mode is configured in the antenna by the acquisition section, (2) that the antenna is installed indoors, in such a case that the receivable information is acquired only when the vertically-polarized-wave reception mode is configured in the antenna by the acquisition section, (3) that the antenna is installed outdoors by calculating a difference by subtracting the second error rate from the first error rate, which error rates are acquired by the acquisition section, in such a case that the receivable information is acquired both in the horizontally-polarized-wave reception mode and also in the vertically-polarized-wave reception mode when they are configured in the antenna by the acquisition section and when the calculated difference is larger than a predetermined threshold value, and (4)that the antenna is installed indoors when the calculated difference is smaller than the predetermined threshold value. That is, as the installation location of the antenna can be identified based on the on-site verification and on the error rates related to whether or not digital television broadcasting can be received in good condition, the installation location of the antenna is more accurately identified.

In the antenna system, the acquisition section may acquire the reception information for each of the television broadcasting signals which correspond to the predetermined number of the channels receivable by the antenna system, the determination section may make the determination based on all reception information acquired by the acquisition section, and the configuration section may configure the outdoor reception program stored in the memory section when the number of the determination results, among the determination results by the determination section, that indicate that the antenna is installed outdoors is larger than the number of the determination results that indicate that the antenna is installed indoors, and the indoor reception program stored in the memory section when the number of the determination results that indicate that the antenna is installed indoors is larger than the number of the determination results that indicate that the antenna is installed outdoors.

According to the antenna system having such a structure, in addition to those advantages, it will be possible to acquire, by the acquisition section, the reception information for each of television broadcasting signals which correspond to a predetermined number of the channels receivable by the antenna system. It will also be possible to make, by the determination section, the determination based on all reception information acquired by the acquisition section. It will further be possible to configure, by the configuration section, (1) the outdoor reception program stored in the memory section, if the number of the determination results, among the determination results by the determination section, that indicate that the antenna is installed in the outdoor is larger than the number of the determination results that indicate that the antenna is installed indoors, and (2) the indoor reception program stored in the memory section, if the number of the determination results indicating that the antenna is installed indoors is larger than the number of the determination results indicating that the antenna is installed in the outdoor.

That is, as the installation location is identified based on a number of the determination results, the installation location of the antenna is more accurately identified.

BRIEF DESCRIPTION OF THE DRAWINGS

The present invention will become more fully understood from the detailed description given hereinafter and the accompanying drawings which are given by way of illustration only, and thus are not intended as a definition of the limits of the scope of the invention, and wherein.

DETAILED DESCRIPTION OF THE PREFERRED EMBODIMENTS

Figure 1:
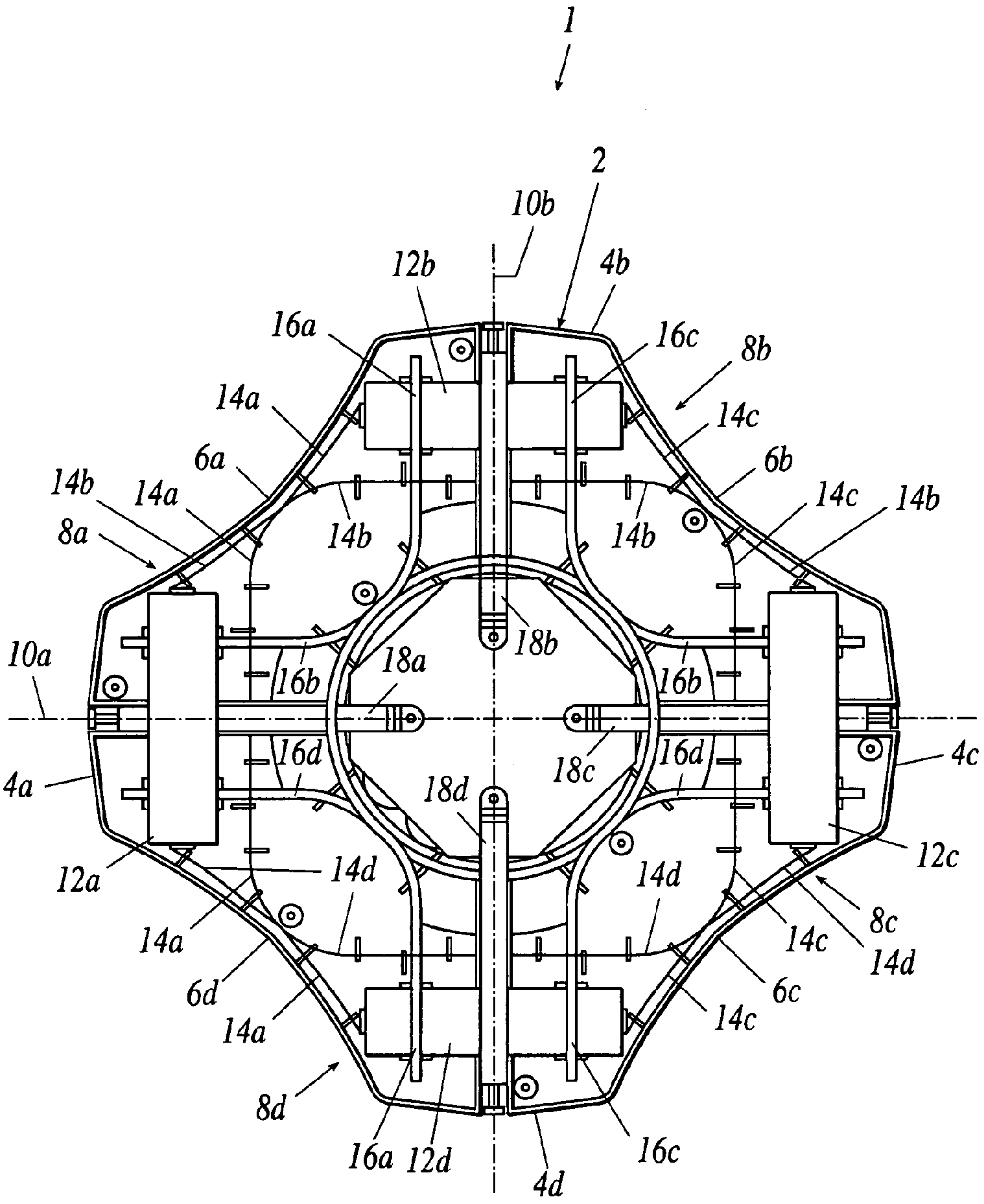
FIG. 1 is a view for an explanation of the inner arrangement of an antenna constituting an antenna system according to a first embodiment the invention.

A preferred embodiment according to the invention will be explained hereinafter, referring to the drawings attached hereto. It should be noted that the scope of the invention is not limited to the embodiment shown in the drawings.

In the embodiment, a set-top box (hereinafter referred to "STB") is exemplified, for the explanation purpose, as a television receiver.

<An Arrangement of an Antenna Body>

An arrangement of a body 2 of an antenna 1 in an antenna system S will be explained hereinafter, referring to FIG. 1.

The antenna 1 is, for instance, constituted by an antenna 1A for a horizontally-polarized-wave, which is horizontally disposed, and two antennas for a vertically-polarized-wave (not shown) which are arranged to cross each other at right angles and are disposed perpendicularly to the antenna 1A for the horizontally-polarized-wave. As the structure of the antenna 1A for the horizontally-polarized-wave is almost the same as that of the antenna for the vertically-polarized-wave, the explanation will be exemplarily made in connection with the antenna 1A for the horizontally-polarized wave, referring to FIG. 1.

The body 2 of the antenna 1A for the horizontally-polarized-wave is formed of a flat and generally octagonal shape. The body 2 has protrudently-curved, convex fringe portions 4*a*-4*d* which are arranged apart from each other by 90 degrees, and reentrantly-curved, concave fringe portions 6*a*-6*d* which are arranged so that they connect the convex fringe portions 4*a*-4*d*.

Within the body 2, plural sets, for instance four sets, of a Yagi-type antennas 8*a*-8*d* for a UHF band are disposed. The Yagi-type antennas 8*a*-8*d* are, for instance, for the reception of the television broadcasting signals in the U.S. in the UHF band of 470 MHz through 860 MHz.

Among the Yagi-type antennas 8*a*-8*d*, two Yagi-type antennas 8*a* and 8*c* are disposed in a plane, for instance, a horizontal plane, along a straight line 10*a* which extend between the opposing convex fringe portions 4*a* and 4*c*. The remaining two Yagi-type antennas 8*b* and 8*d* are disposed in a plane with a different height to the plane where the Yagi-type antennas 8*a* and 8*c* are disposed (e.g. in a downside position), along a straight line 10*b* which crosses the straight line 10*a* at right angles.

The Yagi-type antennas 8*a* and 8*c* have wave-guides 12*a* and 12*c* within the body 2 and adjacent to the convex fringe portions 4*a* and 4*c*. The wave-guides 12*a* and 12*c* are of the same size and disposed horizontally with their surfaces positioned in a plane and on the straight-line 10*a* so as to cross it at right angles.

Radiators 14*a* and 14*b* are disposed in more inside positions than the positions of the wave-guides 12*a* and 12*c*. The radiators 14*a* and 14*c* have driven points at both sides of the straight-line 10*a*. The radiator 14*a* is extended outward so that it crosses the straight-line 10*a* approximately in the right angles, is curved inward at the positions near the concave fringe portions 6*a* and 6*d*, and is further extended, along the concave fringe portions 6*a* and 6*d*, to near the convex fringe portions 4*b* and 4*d*.

Radiators 14*a* and 14*c* are formed of a plate shape. Radiators 14*a* and 14*c* are disposed with their surfaces being vertical, unlike the wave-guides 12*a* and 12*c* which are disposed with their surfaces being horizontal. The upper edges of the radiators 14*a* and 14*c* are positioned approximately at the same height position as that of the wave-guides 12*a* and 12*c*.

Reflectors 16*a* and 16*c* are disposed in more inside positions than the positions of the radiators 14*a* and 14*c*. The reflector 16*a* has straight-line portions at both sides of the straight-line 10*a* and curved portions which start from the inside ends of the respective straight-line portions toward the wave-guides 12*a*. The reflector 16*c* is similarly constituted.

The reflectors 16*a* and 16*c* are formed of a plate shape and disposed at the same height position as that of the wave-guides 12*a* and 12*c*.

The Yagi-type antennas 8*b* and 8*d* have, the same as the Yagi-type antennas 8*a* and 8*c*, wave-guides 12*b* and 12*d*, radiators 14*b* and 14*d* and reflectors 16*b* and 16*d*.

The Yagi-type antennas 8*b* and 8*d* are disposed, on a horizontal plane with the height different from that of the horizontal plane on which the Yagi-type antennas 8*a* and 8*c* are disposed (e.g. in the downside position), so that they cross the Yagi-type antennas 8*a* and 8*c* in the right angles and do not contact them.

Specifically, a part of the radiator 14*a* crosses the radiators 14*b* and 14*d* in a non-contact condition, a part of the radiator 14*b* crosses the radiators 14*a* and 14*c* in a non-contact condition, a part of the radiator 14*c* crosses the radiators 14*b* and 14*d* in a non-contact condition, and a part of the radiator 14*d* crosses the radiators 14*a* and 14*c* in a non-contact condition. Similarly, a part of the reflector 16*a* crosses the reflectors 16*b* and 16*d* in a non-contact condition, a part of the reflector 16*b* crosses the reflector 16*a* and 16*c* in a non-contact condition, a part of the reflector 16*c* crosses the reflector 16*b* and 16*c* in a non-contact condition, and a part of the reflector 16*d* crosses the reflector 16*a* and 16*c* in a non-contact condition. Further, a part of the reflector 16*a* crosses the radiators 14*b* and 14*d* and the wave-guides 12*b* and 12*d* in a non-contact condition, a part of the reflector 16*b* crosses the radiators 14*a* and 14*c* and the wave-guides 12*a* and 12*c* in a non-contact condition, a part of the reflector 16*c* crosses the radiators 14*b* and 14*d* and the wave-guides 12*b* and 12*d* in a non-contact condition, and a part of the reflector 16*d* crosses the radiators 14*a* and 14*c* and the wave-guides 12*a* and 12*c* in a non-contact condition.

Rod antennas 18*a*-18*d* of an even number, e.g. four, are disposed within the body 2. These rod antennas 18*a*-18*d* constitute one combination antenna for a VHF band, which is for the reception of the U.S. television broadcasting signals of 54 MHz through 88 MHz and 174 MHz through 216 MHz.

The rod antennas 18*a*-18*d* are disposed on a horizontal plane between the plane on which the Yagi-type antennas 8*a* and 8*c* are disposed and the plane on which the Yagi-type antennas 8*b* through 8*d* are disposed. Along the straight line 10*a* on that plane, the rod antennas 18*a* and 18*c* are disposed and, along the straight line 10*b* on the same plane, the rod antennas 18*b* and 18*d* are disposed. The rod antennas 18*a*-18*d* are adapted to be extendable outward from the respective convex fringe portions.

The rod antennas 18*a*-18*d* respectively have two driven terminals.

<Structure of the STB>

The constitution of the STB will be explained hereinafter, referring to FIG. 2.

The STB 100 includes an antenna system S having an antenna 1 which can respond to the horizontally-polarized-wave and the vertically-polarized-wave, for receiving digital television broadcasting signals (hereinafter referred to "TV broadcasting signals"), and is connected to an output device 200. Specifically, as shown in FIG. 2, STB 100 is constituted by providing, for instance, a tuner 110 having the antenna 1, a decoder 120, an OSD circuit 130, and a control unit 140, all of which are connected by a bus line B. The STB is connected to the output device 200.

The antenna system S is constituted by the tuner 110 having the antenna 1 and the control unit 140.

The antenna 1 responds to, for instance, the TV broadcasting signals (television broadcasting waves) of the digital horizontally-polarized-wave and vertically-polarized-wave.

It should be noted that the antenna 1 is adapted to be switched over its polarization planes, for instance, by the control unit 140. That is, the antenna 1 receivable of the TV broadcasting signals can be switched over to the antenna 1A for the horizontally-polarized-wave or to the antenna (not shown) for the vertically-polarized wave and, hence, a mode to receive the TV broadcasting signals of the horizontally-polarized-wave (hereinafter referred to "horizontally-polarized-wave reception mode"), or a mode to receive the TV broadcasting signals of the vertically-polarized-wave (hereinafter referred to "vertically-polarized-wave reception mode") is configured in the antenna 1. The antenna 1 adapted not to receive the TV broadcasting signals of the vertically-polarized-wave even if they arrive while the horizontally-polarized reception mode is configured, and not to receive the TV broadcasting signals of the horizontally-polarized-wave even if they arrive while the vertically-polarized-wave reception mode is configured.

The tuner 110, in accordance with the instructions from, for instance, the control unit 140, receives a digital TV broadcasting signal which exists in a frequency band corresponding to the channel that provides the broadcasting program desired by a user, among the digital TV broadcasting signals of the horizontally-polarized-wave or the vertically-polarized-wave received by the antenna 1. Then, the tuner converts the received TV broadcasting signal into an intermediate frequency signal and output it.

Here, the antenna 1 has directional characteristics. The antenna 1 and the tuner 110 are compliant with the prescribed Standards, such as the IA/CEA-999, and are adapted to be able to receive, for instance, in accordance with the instructions from the control unit 140, a TV broadcasting signal corresponding to one channel among the TV broadcasting signals of the most optimum polarization (a horizontally-polarized-wave or a vertically-polarized-wave), which has come from the most optimum direction (one direction out of, for instance, the sixteen (16) directions). The channels receivable by the antenna 1 and the tuner 110 are, for instance, the channels two (2) through sixty-nine (69).

The decoder 120 decodes, for instance, in accordance with the instructions from the control unit 140 and produces a video picture signal and outputs the produced video picture signal.

The OSD circuit 130, for instance, displays a predetermined on-screen-display (hereinafter referred to "OSD") on an image display 210 (to be hereinafter explained) of the output device 200.

Specifically, the OSD circuit 130, for instance, in accordance with the instructions from the control unit 140, outputs an OSD signal for displaying, on the image display 210, a predetermined listing (OSD) relating to receivable channel information.

Figure 2:
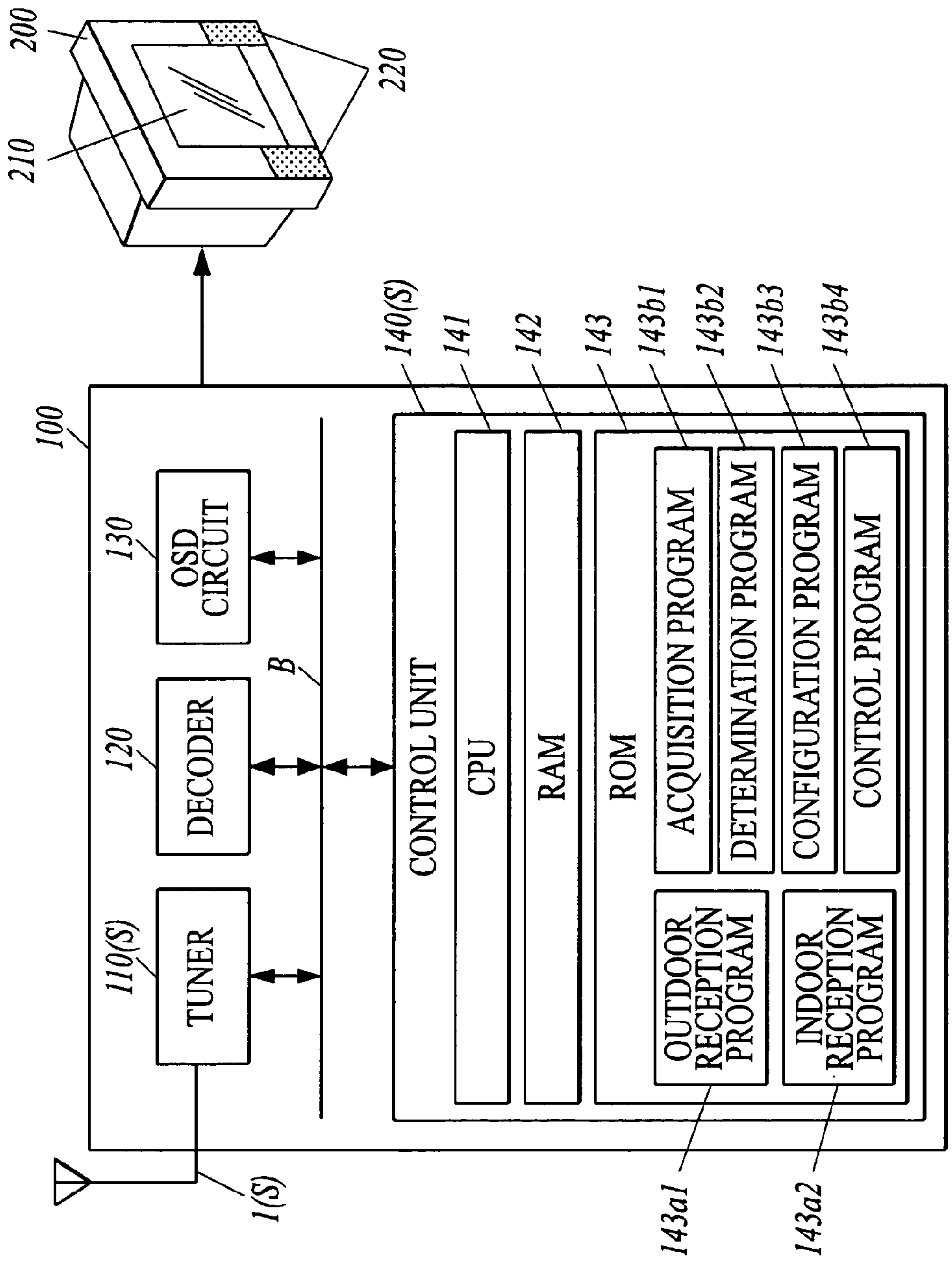
FIG. 2 is a schematic block diagram showing a functional arrangement of an STB embodied the invention.

As shown in FIG. 2, the control unit 140 comprises, for instance, such as a CPU (Central Processing Unit) 141, a RAM (Random Access Memory) 142, and a ROM (Read Only Memory).

The CPU 141 performs various control operations in accordance with the various processing programs, stored in the ROM 143, for the STB 100.

The RAM 142 has such as a program storage aria for developing the processing programs executed by the CPU 141 and a data storage aria for storing such as input data and processed results produced when the input data and the above-mentioned processing programs are executed.

ROM 143 stores such as system programs executable by the STB 100, various processing programs executable by the system programs, data to be used when the various programs are executed, and data relating to various operation results obtained by the CPU 141. It should be noted that the programs are stored in the ROM 143 in the form of a program code readable by a computer.

Specifically, ROM 143, as a memory section, stores an outdoor reception program **143*a*1 and an indoor reception program 143*a*2. The ROM 143 stores such as an acquisition program 143*b*1, a determination program 143*b*2, a configuration program 143*b*3, and a control program 143*b*4**.

The outdoor reception program **143*a*1 is one in which the reception algorithm, for receiving the TV broadcasting signal by the antenna system S when the antenna 1** is installed in the out-of-doors, is programmed.

The indoor reception program **143*a*2 is one in which the reception algorithm, for receiving the TV broadcasting signal by the antenna system S when the antenna 1** is installed indoors, is programmed.

Specifically, the outdoor reception program **143*a*1 and the indoor reception program 143*a*2 are reception programs for making the antenna 1 and the tuner 110 acquire an optimum signal or restore the signal. They are used by the CPU 141 (to be explained hereinafter) that has executed the control program 143*b*4**, during the regular operation after the completion of the process relating to the initial configuration.

The acquisition program **143*b*1 enables the CPU 141 to have functions to configure the horizontally-polarized-wave reception mode or the vertically-polarized-wave reception mode in the antenna 1** and to acquire the reception information of the TV broadcasting signal received by the antenna system S in the respective reception modes.

The CPU 141 is adapted to acquire the reception signal from respective TV broadcasting signals corresponding to the predetermined number of the channels (e.g. all channels, for instance, the channels 2 through 69) receivable by the antenna system S (i.e. the antenna 1 and the tuner 110).

The reception signal includes receivable information, a horizontal bit error rate (hereinafter referred to "the horizontal BER") as the first error rate, and a vertical bit error rate (hereinafter referred to "the vertical BER") as the second error rate.

The receivable information is acquired by the CPU 141 when the horizontally-polarized-reception mode or the vertically-polarized-reception mode is configured by the CPU 141 and a TV broadcasting signal corresponding to one channel is received by the antenna 1 and the tuner 110.

The horizontal BER is acquired, by the CPU 141, from the TV broadcasting signal corresponding to one channel received by the antenna and the tuner 110. Specifically, when the CPU 141 configures the horizontally-polarized-wave reception mode in the antenna 1 and acquires the receivable information and when the horizontal BER is produced in the tuner 141 from the TV broadcasting signal received by the antenna 1 and the tuner 110, the CPU 141 acquires the produced horizontal BER from the tuner 110. Then, the CPU 141 determines whether or not the acquired horizontal BER is larger than the predetermined value.

The vertical BER is acquired, by the CPU 141, from the TV broadcasting signal corresponding to one channel received by the antenna and the tuner 110. Specifically, when the CPU 141 configures the vertically-polarized-wave reception mode in the antenna 1 and acquires the receivable information, and when the vertical BER is produced in the tuner 141 from the TV broadcasting signal received by the antenna 1 and the tuner 110, the CPU 141 acquires the produced vertical BER from the tuner 110. Then, the CPU 141 determines whether or not the acquired vertical BER is larger than the predetermined value.

The CPU 141 functions as an acquisition section by executing the above-mentioned acquisition program **143*b*1**.

The determination program **142*b*2 enables the CPU 141 to have a function to determine whether the antenna 1 is installed in the out-of-doors or indoors, based on the reception information acquired by the CPU 141 that executes the acquisition program 143*b*1** in the horizontally-polarized-wave reception mode or in the vertically-polarized-wave reception mode.

Incidentally, the CPU 141 is adapted to make the determination based on all reception information acquired by the CPU 141 that executed the acquisition program.

Specifically, the CPU 141 determines that the antenna 1 is installed outdoors, in the case that the TV broadcasting signal which corresponds to one channel is received by the antenna 1 and the tuner 110 when the antenna is configured in the horizontally-polarized-wave reception mode by the CPU 141 that executed the acquisition program **143*b*1 and when the TV broadcasting signal which corresponds to one channel is not received by the antenna 1 and the tuner 110 when the antenna is configured in the vertically-polarized-wave reception mode (that is, in the case that the receivable information is acquired, by the CPU 141 which executed the acquisition program 143*b*1, only when the horizontally-polarized-wave reception mode is configured in the antenna 1), and that the CPU 141 which executed the acquisition program 143*b*1** determines that the horizontal BER is larger than the predetermined value.

On the other hand, the CPU 141 determines that the antenna 1 is installed indoors, in the case that the TV broadcasting signal which corresponds to one channel can not be received by the antenna 1 and the tuner 110 when the antenna is configured in the horizontally-polarized-wave reception mode by the CPU 141 that executed the acquisition program **143*b*1 and the TV broadcasting signal which corresponds to one channel is received by the antenna 1 and the tuner 110 when the antenna is configured in the vertically-polarized-wave reception mode (that is, in the case that the receivable information is acquired, by the CPU 141 which executed the acquisition program 143*b*1, only when the vertically-polarized-wave reception mode is configured in the antenna 1), and that the CPU 141 which executed the acquisition program 143*b*1** determines that the vertical BER is larger than the predetermined value.

Furthermore, in the case that the TV broadcasting signal which corresponds to one channel is received by the antenna 1 and the tuner 110 when the antenna is configured in the horizontally-polarized-wave reception mode by the CPU 141 that executed the acquisition program **143*b*1 and the TV broadcasting signal which corresponds to one channel is also received by the antenna 1 and the tuner 110 when the antenna is configured in the vertically-polarized-wave reception mode (that is, when the receivable information is acquired when the horizontally-polarized-wave reception mode is configured and also when the vertically-polarized-wave reception mode is configured in the antenna 1, by the CPU 141 which executed the acquisition program 143*b*1), and that the CPU 141 which executed the acquisition program 143*b*1 determines that the horizontal BER and the vertical BER, both acquired by the CPU 141 which executed the acquisition program 143*b*1, are larger than the predetermined value, the CPU 141 calculates the difference by subtracting the vertical BER from the horizontal BER and determines that the antenna 1** is installed outdoors if the calculated difference is larger than a predetermined threshold value and that the antenna is installed indoors if the calculated difference is smaller than a predetermined threshold value.

The CPU 141 functions as a determination section by executing the determination program **143*b*2** as mentioned above.

The configuration program **143*b*3 enables the CPU 141 to have functions to configure (1) the outdoor reception program 143*a*1 stored in the ROM 143 in the case that the CPU 141 which executed the determination program 143*b*2 determines that the antenna 1 is installed outdoors, and (2) the outdoor reception program 143*a*2 stored in the ROM 143 in the case that the CPU 141 which executed the determination program 143*b*2 determines that the antenna 1** is installed indoors.

Specifically, the CPU 141 configures the outdoor reception program **143*a*1 stored in the ROM 143, in the case that the number of the determination results, among the determination results obtained by the CPU 141, that indicate that the antenna is installed in the outdoor is larger than the number of the determination results that indicate that the antenna is installed indoors, and further configures the indoor reception program 143*a*2 stored in the ROM 143 in the case that the number of the determination results indicating that the antenna 1 is installed indoors is larger than the determination results indicating that the antenna 1 is installed in the outdoor. The determination results are obtained by the CPU 141 which executed the determination program 143*b*2 based on the reception information, which is acquired by the CPU 141 that executed the acquisition program 143*b*1**, of the broadcasting signals corresponding to the predetermined number of the channels.

The CPU 141 functions as a configuration section by executing the configuration program **143*b*3** as mentioned above.

The control program **143*b*4 enables the CPU 141 to have functions to control the reception of the TV broadcasting signals by the antenna system S, by the outdoor reception program 143*a*1 or the indoor reception program 143*a*2, both configured by the CPU 141 that executed the configuration program 143*b*3**.

The CPU 141 is adapted to control, by executing the control program **143*b*4, the reception of the TV broadcasting signals by the antenna 1 and the tuner 110** during the regular operation after the process relating to the initial configuration was completed.

The CPU 141 functions as a control section by executing the control program **143*b*4** as mentioned above.

As shown in FIG. 2, the output device 200 to which the STB is connected comprises, for instance, the image display 210 and audio output units 220.

The image display 210 is, for instance, a liquid crystal display which displays images corresponding to image data based on the video picture signal outputted from the decoder 120 or images corresponding to image data based on both the video picture signal outputted from the decoder 120 and the OSD signal added by the OSD circuit 130.

The audio output units 220 are, for instance, loudspeakers, and output voice corresponding to the audio data based on the video picture signal outputted from the decoder 120.

<Configuration Process of the Reception Program>

Figure 3A:
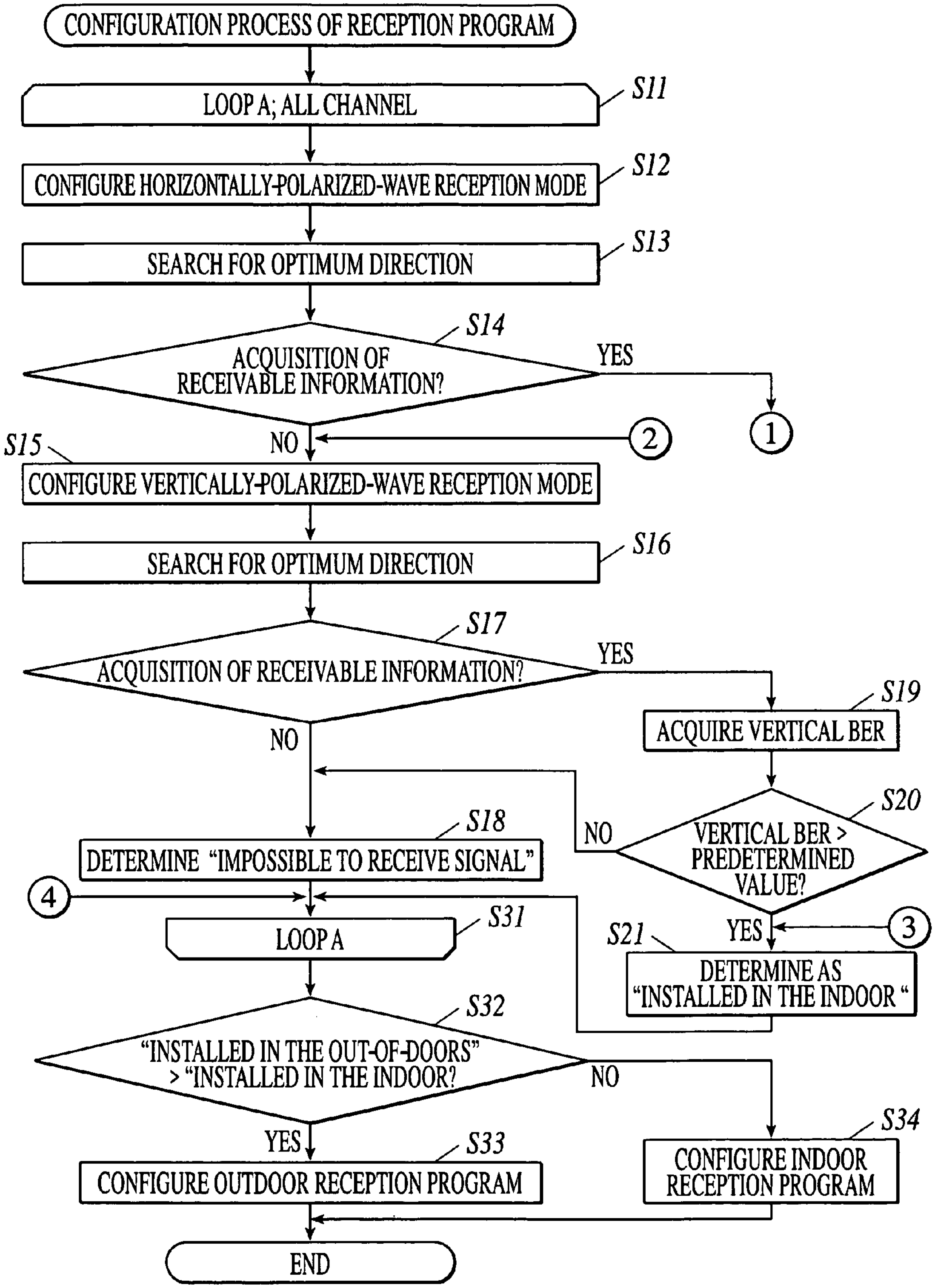
FIGS. 3A and 3B are flowcharts for an explanation of the processes relating to the configuration of a reception program by the STB.
Figure 3B:
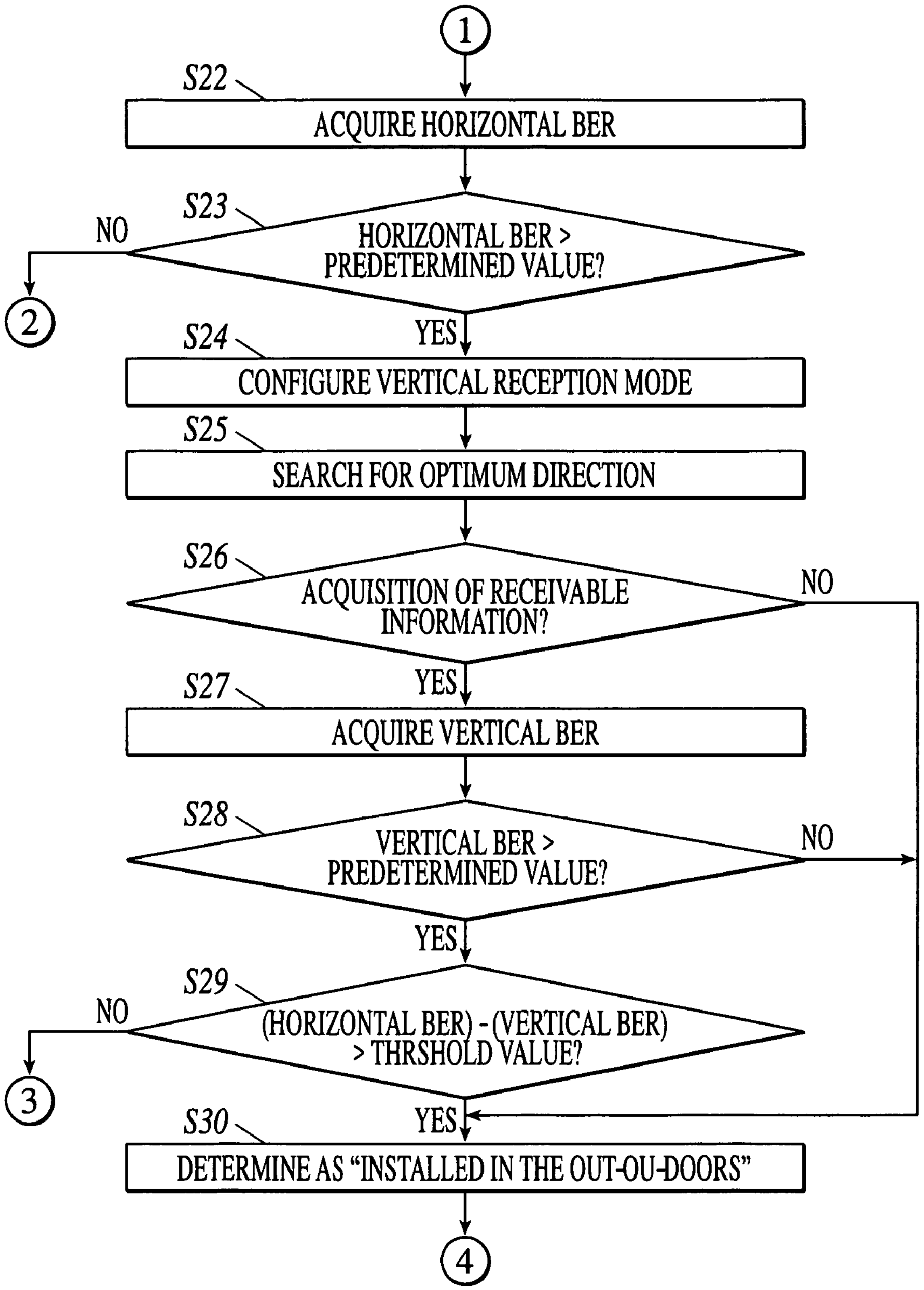

The process regarding the reception program by STB 100 will be hereinafter explained, referring to a flowchart shown in. FIGS. 3A AND 3B.

It should be noted that the configuration process of the reception program is, for instance, one of the processes relating to the initial configuration. Specifically, it is automatically executed in the course of the processes relating to the initial configuration in the STB, for instance, while a receivable channel is being selected.

The CPU 141 repeatedly executes the process of a loop A (Steps S11 through S31) for each of the TV broadcasting signals corresponding to all channels receivable by the antenna 1 and the tuner 110.

Specifically, in the process of the loop A for one channel, the CPU 141 executes the acquisition program **143*b*1, configures the horizontally-polarized-wave reception mode in the antenna (step S12), and searches the optimum direction for the reception, by the antenna 1 and the tuner 110, of the TV broadcasting signal which corresponds to the above-mentioned one channel: (step S13**).

The CPU 141 executes the determination program **143*b*2 and determines whether the CPU 141, which executed the acquisition program 143*b*1, acquired the receivable information during the search of the optimum direction in a step S13: (Step S14**).

In the step S14, if it is determined that the receivable information was not acquired (the step S14; "No"), that is, in the case that the TV broadcasting signal corresponding to the one channel could not be received by the antenna 1 and the tuner 110, the CPU 141 executes the acquisition program **143*b*1 and configures the vertically-polarized-wave reception mode in the antenna (step S15), and searches the optimum direction for reception of the TV broadcasting signal corresponding to the one channel by the antenna 1 and the tuner 110: (step S16**).

Following the above-mentioned steps, the CPU 141 executes the determination program **143*b*2 and determines, when the optimum direction is searched in the step S16, whether or not the CPU 141 which executed the acquisition program 143*b*1 acquired the receivable information (step 17**).

In the step 17, if it is determined that the receivable information was not acquired (the step S17; "No"), that is, in the case that the television broadcasting signal corresponding to the one channel was not received by the antenna 1 and the tuner 110 when the optimum direction was searched in the step S16, the CPU 141 determines that the reception of the TV broadcasting signal corresponding the one channel is impossible (step S18), and terminates the process of the "loop A" after having had the RAM 142 store the determination result (step S31).

On the other hand, if it is determined that the receivable information was acquired (the step S17; "Yes"), that is, in the case that the television broadcasting signal corresponding to the one channel was received by the antenna 1 and the tuner 110 when the optimum direction was searched in the step S16, the CPU 141 executes the acquisition program 143*b*1, acquires the vertical BER (step S19) from the TV broadcasting signal received by the antenna 1 and the tuner 110, and determines whether the acquired vertical BER is larger than the predetermined value: (step S20).

In the step S20, if it is determined that the vertical BER is not larger than the predetermined value (the step S20; "No"), then, the process by the CPU 141 moves into the process of the step 18.

On the other hand, if it is determined that the vertical BER is larger than the predetermined value (the step S20; "Yes"), then, the CPU 141 determines that the antenna is installed indoors (step 21) and terminates the process of the "loop A" with respect to the one channel after having had the RAM 142 store the determination result (the step S31).

In the step S14, if it is determined that the receivable information was acquired, that is, in the case that the TV broadcasting signal corresponding to the one channel was received by the antenna 1 and the tuner 110, when the optimum direction was searched in the step S16, the CPU 141 executes the acquisition program 143*b*1, acquires the horizontal BER (step S22) from the TV broadcasting signal received by the antenna 1 and the tuner 110, and determines whether the acquired horizontal BER is larger than the predetermined value: (step S23).

In the step S23, if it is determined that the horizontal BER is not larger than the predetermined value (the step S23; "No"), then, the process by the CPU 141 moves into the process of the step S15.

On the other hand, if it is determined that the horizontal BER is larger than the predetermined value (the step S23; "Yes"), then, the CPU 141 configures the vertically-polarized wave reception mode in the antenna 1 (step S24) and searches the optimum direction for the reception, by the antenna 1 and the tuner 110, of the TV broadcasting signal which corresponds to the one channel (step S25).

Then, the CPU 141, executes the determination program 143*b*2 and determines whether the CPU 141, which executed the acquisition program 143*b*1, acquired the receivable information during the search of the optimum direction in the step S25: (step S26).

In the step S26, if it is determined that the receivable information was not acquired (the step S26; "No"), that is, in the case that the TV broadcasting signal corresponding to the one channel was not received by the antenna 1 and the tuner 110 when the optimum direction was searched at the step S25, the process by the CPU 141 moves into the process of a step S30.

On the other hand, if it is determined that the receivable information was acquired (the step S26; "Yes"), that is, in the case that the TV broadcasting signal corresponding to the one channel was received by the antenna 1 and the tuner 110, when the optimum direction was searched in the step S16, the CPU 141 executes the acquisition program 143*b*1, acquires the vertical BER (step S27) from the TV broadcasting signal received by the antenna 1 and the tuner 110, and determines whether the acquired vertical BER is larger than the predetermined value: (step S28).

In the step S28, if it is determined that the vertical BER is not larger than the predetermined value (the step S28; "No"), then, the process by the CPU 141 moves into the process of the step S30.

On the other hand, if it is determined, in the step S28, that the vertical BER is larger than the predetermined value (the step S28; "Yes"), then, the CPU 141 executes the determination program 143*b*2 and calculates the difference by subtracting the vertical BER acquired in a step 27 from the horizontal BER acquired in the step S22, and further determines whether the calculated difference is larger than the predetermined threshold value (step S29).

If it is determined, in the step S29, that the difference obtained by subtracting the vertical BER from the horizontal BER is not larger than the predetermined threshold value (the step S29; "No"), the process by the CPU 141 moves into a step 21.

On the other hand, if it is determined, in the step 29, that the difference obtained by subtracting the vertical BER from the horizontal BER is larger than the predetermined threshold value (the step S29; "Yes"), the CPU 141 determines that the antenna 1 is installed in the out-of-doors (step S30) and terminates the process of the "loop A" with respect to the one channel after having had the RAM 142 store the determination result: (the step S31).

After the termination of the process of the loop A (the step S31) for all TV broadcasting signals corresponding to the channels receivable by the antenna 1 and the tuner 110, the CPU 141 executes the configuration program 143*b*3 and determines whether or not the number of the determination results, among all the determination results obtained by the process of the loop A and stored in the RAM 142, that indicates that the antenna 1 is installed in the out-of-doors is larger than the determination results indicating that the antenna 1 is installed indoors: (step 32).

In the step S32, if it is determined that the number of the determination results indicating that the antenna 1 is installed outdoors is larger (the step S32; "Yes"), the CPU 141 configures the outdoor reception program 143*a*1 (step S33) stored in the ROM143 and terminates the process.

On the other hand, if it is determined that the number of the determination results indicating that the antenna 1 was installed outdoors is smaller (the step S32; "No"), the CPU 141 configures the indoor reception program 143*a*2 (step S34) stored in the ROM143 and terminates the process.

In this way, the processes relating to the initial configuration, including the configuration process of the reception program, in the STB 100 are terminated and the operation moves into the regular operation of the STB 100. By the above-described manner, the CPU 141 executes the control program 143*b*4 and control, through the outdoor reception program 143*a*1 configured in the step S33 or the indoor reception program 143*a*2 configured in the step S34, the reception of the TV broadcasting signals by the antenna 1 and the tuner 110.

In the STB having the antenna system S, according to the invention as explained above, the antenna system S (the tuner 110 having the antenna 1 and the control unit 140) for receiving the digital broadcasting signals comprises the antenna 1 responding to both the horizontally-polarized-wave and the vertically-polarized-wave and can store, through the ROM 143, the outdoor reception program 143*a*1 for receiving the TV broadcasting signals by the antenna system S when the antenna 1 is installed in the out-of-doors, and the indoor reception program **143*a*2 for receiving the TV broadcasting signals by the antenna system S when the antenna 1** is installed indoors.

In addition, the antenna system can acquire, through the CPU 141 which executes the acquisition program **143*b*1** and configures the horizontally-polarized-wave reception mode or the vertically-polarized-wave reception mode for each of the TV broadcasting signals corresponding to the predetermined number of the channels receivable by the antenna system S, the reception information of the TV broadcasting signals received by the antenna system S in the respective modes.

Furthermore, the antenna system can determines, through the CPU which executes the determination program **143*b*2, whether the antenna 1 is installed outdoors or indoors, based on the reception information acquired by the CPU 141 which executed the acquisition program 143*b*1** in the horizontally-polarized-wave reception mode or the vertically-polarized-wave reception mode.

Moreover, the antenna system can configure, through the CPU 141 which executed the configuration program **143*b*3 and based on the reception information of the TV broadcasting signals corresponding to the predetermined number of the channels, which reception information is acquired in the horizontally-polarized-wave reception mode or the vertically-polarized-wave reception mode by the CPU 141 which executed the acquisition program 143*b*1, (1) the outdoor reception program 143*a*1 in the case that the number of the determination results, among the determination results obtained by the CPU 141 which executed the determination program 143*b*2 and based on the reception information acquired by the CPU 141 which executed the acquisition program 143*b*1, that indicate that the antenna is installed in the outdoor is larger than the number of the determination results that indicate that the antenna 1 is installed indoors, and (2) the indoor reception program 143*a*2 stored in the ROM 143 in the case that the number of the determination results that indicate that the antenna 1 is installed indoors is larger than the number of the determination results that indicate that the antenna 1** is installed outdoors.

Furthermore, the antenna system can control, through the CPU 141 which executed the control program **143*a*2, the reception of the TV broadcasting signals, based on the outdoor reception program 143*a*1 or the indoor reception program 143*a*2 both configured by the CPU 141 which executed the configuration program 143*a*1**.

Therefore, a determined result as to whether the installation location of the antenna 1 is outdoors or indoors can be automatically configured. Accordingly, the burden that may be imposed upon a user can be lightened. In addition, as the determination of the installation location of the antenna 1 is made based on a number of the determination results, the installation location can be accurately determined. Furthermore, as the optimum reception program (i.e. the outdoor reception program or the indoor reception program) is configured and used, the reception performance of the antenna 1 is improved.

The reception information acquired by the CPU 141 which executed the acquisition program **143*b*1 includes (1) the receivable information obtained when the horizontally-polarized-wave reception mode or the vertically-polarized-wave reception mode is configured in the antenna 1 and when the television broadcasting signal is received in the horizontally-polarized-wave reception mode or the vertically-polarized-wave reception mode, (2) the horizontal BER acquired from the television broadcasting signal received by the antenna system S when the antenna 1 is configured in the horizontally-polarized-wave reception mode and the receivable information is acquired, and (3)the vertical BER acquired from the television broadcasting signal received by the antenna system S when the antenna 1** is configured in the vertically-polarized-wave reception mode and the receivable information is acquired.

Thus, it can be determined, by the CPU 141 which executed the determination program **143*b*1, that the antenna 1 is installed outdoors in the case that the receivable information is acquired only when the antenna 1 is configured in the horizontally-polarized-wave reception mode by the CPU 141 which executed the acquisition program 143*b*1, and that the horizontal BER acquired by the CPU 141 which executed the acquisition program 143*b*1** is determined that it is larger than the predetermined value.

Further, it can be determined, by the CPU 141 which executed the acquisition program **143*b*1, that the antenna 1 is installed indoors in the case that the receivable information is acquired only when the antenna 1 is configured in the vertically-polarized-wave reception mode and that the vertical BER acquired by the CPU 141 which executed the acquisition program 143*b*1** is determined that it is larger than the predetermined value.

Moreover, in the case that the receivable information is acquired when the antenna 1 is configured in the horizontally-polarized-wave reception mode and also in the vertically-polarized-wave reception mode and that the horizontal BER and the vertical BER acquired by the CPU 141 which executed the acquisition program **143*b*1 are determined that they are larger than the predetermined value, the difference between the horizontal BER and the vertical BER is calculated by subtracting the acquired vertical BER from the acquired horizontal BER, and it can be determined that the antenna 1 outdoors if the difference is larger than the predetermined threshold value and that the antenna 1 is installed indoors if the difference is smaller than the threshold value. That is, as the installation location of the antenna 1** can be identified based on the on-site verification as to whether or not the TV broadcasting signals are received by the antenna system S, and further, based on the bit-error-rate relating to whether the digital television broadcasting is received in a good condition, the location where the antenna is installed can be accurately identified.

It should be noted that the present invention is not limited to the preferred embodiment described above, and may be suitably modified or varied without departing the scope and sprit of the invention.

Further, the television receiver is not limited to the STB 100, any suitable television receiver which comprises the antenna system S can be used.

Any process for determining the location where the antenna is installed can be used so long as such determination is made based on the reception information in the horizontally-polarized-wave mode or the vertically-polarized-wave reception mode.

Moreover, although the determination of the installation location of the antenna is made, in the above-described embodiment, for all receivable channels, the number of the determination is discretionary so long as the reception program is accurately configured.

Furthermore, in the above-described embodiment, although the reception program to be configured is determined by majority decision of the number of the determination results indicating that the antenna is installed in the out-of-doors and the number of the determination result indicating that the antenna is installed indoors, any determination process for selecting the reception program can be used without any limitation so long as such determination is accurately made by using the determination results indicating that the antenna is installed in the out-of-doors and that the antenna is installed outdoors.

In the configuration process (FIGS. 3A and 3B), though the horizontally-polarized-wave reception mode is first configured and, thereafter, the vertically-polarized-wave reception mode is configured, a reverse configuration process is also possible.

In the above-described embodiment, the configuration process of the reception program is adapted to be included in the process relating to the initial configuration in the STB 100. However, the timing of executing the process of the reception program is discretionary without any limitation so long as it is appropriate timing. It may be also possible to give instructions to the CPU 141, through manipulation of a remote controller (not shown) by a user, to execute the configuration process of the reception program at the timing that the user desires.

The present U.S. patent application claims a priority under the Paris Convention of Japanese patent application No. 2005-278476 filed on Sep. 26, 2006, and shall be a basis of correction of an incorrect translation.

What is claimed is:

1. A television receiver comprising antenna system which includes an antenna capable of responding to a horizontally-polarized-wave and a vertically-polarized-wave and receives digital television broadcasting signals, the antenna system further comprising:

a memory section to store an outdoor reception program for receiving television broadcasting signals when the antenna is installed outdoors, and an indoor reception program for receiving the television broadcasting signals when the antenna is installed indoors;

an acquisition section to configure in the antenna a horizontally-polarized-wave reception mode or a vertically-polarized-wave reception mode, and to acquire reception information of the television broadcasting signals by means of the antenna system in the respective reception modes;

a determination section to determine whether the antenna is installed outdoors or indoors, based on the reception information acquired by the acquisition section when the antenna is in the horizontally-polarized-wave reception mode or in a vertically-polarized-wave reception mode;

a configuration section to control the outdoor reception program stored in the memory section when the determination section determines that the antenna is installed outdoors, and the indoor reception program stored in the memory section when the determination section determines that the antenna is installed indoors; and a control section to control the reception of the television broadcasting signals by the antenna system through the outdoor reception program or the indoor reception program, both configured by the determination section, wherein the reception information acquired by the acquisition section includes:

a receivable information obtained when the television broadcasting signal is received in the horizontally-polarized-wave reception mode or in the vertically-polarized-wave reception mode, which are respectively configured in the antenna;

a first error rate acquired from the television broadcasting signal received by the antenna system when the antenna is configured in the horizontally-polarized-wave reception mode and the receivable information is acquired; and a second error rate acquired from the television broadcasting signal received by the antenna system when the antenna is configured in the vertically-polarized-wave reception mode and the receivable information is acquired, and the determination section determines:

that the antenna is installed in the out-of-doors, in a case that the receivable information is acquired only when the horizontally-polarized-wave reception mode is configured in the antenna by the acquisition section;

that the antenna is installed indoors, in a case that the receivable information is acquired only when the vertically-polarized-wave reception mode is configured in the antenna by the acquisition section;

that the antenna is installed outdoors by calculating a difference by subtracting the second error rate from the first error rate, which error rates are acquired by the acquisition section, in a case that the receivable information is acquired both in the horizontally-polarized-wave reception mode and in the vertically-polarized-wave reception mode when they are configured in the antenna by the acquisition section and when the calculated difference is larger than a predetermined threshold value; and that the antenna is installed indoors when the calculated difference is not larger than the predetermined threshold value.

2. An antenna system which includes an antenna capable of responding to a horizontally-polarized-wave and a vertically-polarized-wave and receives digital television broadcasting signals, the antenna system further comprising:

a memory section to store an outdoor reception program for receiving television broadcasting signals when the antenna is installed outdoors, and an indoor reception program for receiving the television broadcasting signals when the antenna is installed indoors;

an acquisition section to configure in the antenna a horizontally-polarized-wave reception mode or a vertically-polarized-wave reception mode, and to acquire reception information of the television broadcasting signals by means of the antenna system in the respective reception modes;

a determination section to determine whether the antenna is installed outdoors or indoors, based on the reception information acquired by the acquisition section when the antenna is in the horizontally-polarized-wave reception mode or in a vertically-polarized-wave reception mode;

a configuration section to control the outdoor reception program stored in the memory section when the determination section determines that the antenna is installed outdoors, and the indoor reception program stored in the memory section when the determination section determines that the antenna is installed indoors; and a control section to control the reception of the television broadcasting signals by the antenna system through the outdoor reception program or the indoor reception program, both configured by the determination section.

3. The antenna system according to claim 2, wherein the reception information acquired by the acquisition section includes:

a receivable information obtained when the television broadcasting signal is received in the horizontally-polarized-wave reception mode or in the vertically-polarized-wave reception mode, which are respectively configured in the antenna;

a first error rate acquired from the television broadcasting signal received by the antenna system when the antenna is configured in the horizontally-polarized-wave reception mode and the receivable information is acquired; and a second error rate acquired from the television broadcasting signal received by the antenna system when the antenna is configured in the vertically-polarized-wave reception mode and the receivable information is acquired, and the determination section determines:

that the antenna is installed outdoors, in a case that the receivable information is acquired only when the horizontally-polarized-wave reception mode is configured in the antenna by the acquisition section;

that the antenna is installed indoors, in a case that the receivable information is acquired only when the vertically-polarized-wave reception mode is configured in the antenna by the acquisition section;

that the antenna is installed outdoors by calculating a difference by subtracting the second error rate from the first error rate, which error rates are acquired by the acquisition section, in a case that the receivable information is acquired both in the horizontally-polarized-wave reception mode and in the vertically-polarized-wave reception mode when they are configured in the antenna by the acquisition section and when the calculated difference is larger than a predetermined threshold value; and that the antenna is installed indoors when the calculated difference is not larger than the predetermined threshold value.

4. The antenna system according to claim 3, wherein the acquisition section acquires the reception information for each of the television broadcasting signals which correspond to the predetermined number of the channels receivable by the antenna system, the determination section makes the determination based on all reception information acquired by the acquisition section, and the configuration section configures the outdoor reception program stored in the memory section when the number of the determination results, among the determination results by the determination section, that indicate that the antenna is installed outdoors is larger than the number of the determination results that indicate that the antenna is installed indoors, and the indoor reception program stored in the memory section when the number of the determination results that indicate that the antenna is installed indoors is larger than the number of the determination results that indicate that the antenna is installed outdoors.

* * * * *